US011921704B2

(12) United States Patent
Gupta et al.

(10) Patent No.: US 11,921,704 B2
(45) Date of Patent: Mar. 5, 2024

(54) VERSION CONTROL INTERFACE FOR ACCESSING DATA LAKES

(71) Applicant: VMware LLC, Palo Alto, CA (US)

(72) Inventors: Abhishek Gupta, San Jose, CA (US); Richard P. Spillane, Palo Alto, CA (US); Christos Karamanolis, Los Gatos, CA (US); Marin Nozhchev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 5 days.

(21) Appl. No.: 17/564,206

(22) Filed: Dec. 28, 2021

(65) Prior Publication Data

US 2023/0205757 A1 Jun. 29, 2023

(51) Int. Cl.
*G06F 16/23* (2019.01)
*G06F 16/22* (2019.01)

(52) U.S. Cl.
CPC ...... *G06F 16/2379* (2019.01); *G06F 16/2246* (2019.01)

(58) Field of Classification Search
CPC .......... G06F 16/2379; G06F 16/2246
See application file for complete search history.

(56) References Cited

U.S. PATENT DOCUMENTS

| | | | |
|---|---|---|---|
| 8,103,685 B1 | 1/2012 | Farizon et al. | |
| 9,946,738 B2 | 4/2018 | Meacham et al. | |
| 10,789,461 B1* | 9/2020 | Agrawal | G06F 40/295 |
| 11,522,703 B1 | 12/2022 | Jain et al. | |

(Continued)

FOREIGN PATENT DOCUMENTS

| | | |
|---|---|---|
| CN | 113505048 A | 10/2021 |
| CN | 115827763 A | 3/2023 |

(Continued)

OTHER PUBLICATIONS

Unknown, "Delta Lake Reliability, security and performance for your data lake", databricks, 2021, 7 pages, https://databricks.com/p/ebook/delta-lake-the-definitive-guide-by-oreilly?msclkid=7791069adcb31b61c9be674ccda6c5ba.

(Continued)

*Primary Examiner* — Huawen A Peng
(74) *Attorney, Agent, or Firm* — King Intellectual Asset Management

(57) ABSTRACT

A version control interface for data provides a layer of abstraction that permits multiple readers and writers to access data lakes concurrently. An overlay file system, based on a data structure such as a tree, is used on top of one or more underlying storage instances to implement the interface. Each tree node tree is identified and accessed by means of any universally unique identifiers. Copy-on-write with the tree data structure implements snapshots of the overlay file system. The snapshots support a long-lived master branch, with point-in-time snapshots of its history, and one or more short-lived private branches. As data objects are written to the data lake, the private branch corresponding to a writer is updated. The private branches are merged back into the master branch using any merging logic, and conflict resolution policies are implemented. Readers read from the updated master branch or from any of the private branches.

20 Claims, 12 Drawing Sheets

(56) References Cited

U.S. PATENT DOCUMENTS

| | | | |
|---|---|---|---|
| 11,599,514 | B1 | 3/2023 | Agrawal et al. |
| 11,625,334 | B2 | 4/2023 | Ki et al. |
| 11,631,014 | B2 | 4/2023 | Stocker et al. |
| 11,664,099 | B1 | 5/2023 | Jain et al. |
| 2009/0254693 | A1 | 10/2009 | Karmanolis et al. |
| 2012/0089569 | A1 | 4/2012 | Mason et al. |
| 2012/0265742 | A1 | 10/2012 | Burckhard et al. |
| 2013/0013556 | A1 | 1/2013 | Yamada |
| 2013/0346725 | A1* | 12/2013 | Lomet ............... G06F 12/0804 |
| | | | 711/206 |
| 2016/0077920 | A1 | 3/2016 | Regni et al. |
| 2016/0246802 | A1 | 8/2016 | Regni et al. |
| 2017/0212680 | A1* | 7/2017 | Waghulde ............ G06F 3/0616 |
| 2017/0212919 | A1* | 7/2017 | Li ...................... G06F 13/4068 |
| 2017/0220403 | A1 | 8/2017 | Maag et al. |
| 2019/0155870 | A1 | 5/2019 | Prakash et al. |
| 2019/0188097 | A1 | 6/2019 | Gupta et al. |
| 2019/0243812 | A1* | 8/2019 | Korotkov ........... G06F 16/2365 |
| 2020/0068038 | A1 | 2/2020 | Xing et al. |
| 2020/0104225 | A1 | 4/2020 | Erickson et al. |
| 2020/0174966 | A1 | 6/2020 | Szczepanik et al. |
| 2020/0334241 | A1 | 10/2020 | Muralidhar et al. |
| 2021/0073411 | A1 | 3/2021 | Eberlein et al. |
| 2021/0097061 | A1* | 4/2021 | Amihod .............. G06F 16/2228 |
| 2021/0240711 | A1 | 8/2021 | Coleman et al. |
| 2021/0319115 | A1* | 10/2021 | Kassouf ............. H04L 63/0428 |
| 2022/0138169 | A1 | 5/2022 | Yelheri et al. |
| 2022/0164672 | A1* | 5/2022 | Bird ....................... G06N 3/045 |
| 2022/0334725 | A1 | 10/2022 | Mertes et al. |
| 2022/0374404 | A1* | 11/2022 | Johnson ............. G06F 16/2246 |
| 2023/0123919 | A1 | 6/2023 | Trachy et al. |
| 2023/0205757 | A1 | 6/2023 | Gupta et al. |

FOREIGN PATENT DOCUMENTS

| | | |
|---|---|---|
| CN | 116094628 A | 5/2023 |
| EP | 3273405 A1 | 1/2018 |
| JP | 3944231 B2 | 8/2006 |

OTHER PUBLICATIONS

Unknown, "Pachyderm Versioned Data Concepts", Apr. 5, 2021, 21 pages, https://github.com/pachyderm/pachyderm/blob/master/doc/docs/1.13.x/concepts/data-concepts/index.md.

Unknown, "About Nessie—Project nessie: A git-like Experience for your Data Lake" Sep. 9, 2021, 32 pages, https://projectnessie.org/features/.

Berenson, Hal et al., "A Critique of ANSI SQL Isolation Levels", Proc. ACM SIGMOD 95, Jun. 1995, 12 pages, https://arxiv.org/pdf/cs/0701157.pdf.

Wikipedia, "Isolation (database systems)", 8 pages, https://en.wikipedia.org/wiki/Isolation_(database_systems), Dec. 21, 2021, 8 pages.

Van Russel-Delrio, Deborah, "International Search Report & Written Opinion", International Application No. PCT/US22/50808, dated Mar. 6, 2023, 10 pages.

Merlevede, Jonathan, "What is lakeFS: A Critical Survey", Sep. 2021, retrieved on Feb. 23, 2023, https://medium.com/datamindedbe/what-is-lakefs-a-critical-survey-edce708a9b8e, 13 pages.

Unknown, "About Nessie—Project Nessie: Transactional Catalog for Data Lakes with Git-like semantics", Dec. 6, 2021, retrieved on Feb. 23, 2023, https://web.archive.org/web/20211206045131/https://projectnessie.org/features/#about-nessie, 9 pages.

Bhardwaj, Anant et al., "DataHub: Collaborative Data Science & Dataset Version Management at Scale", Sep. 2, 2014, retrieved on May 18, 2021, https://arxiv.org/pdf/1409.0798.pdf, 7 pages.

Gundlach, Susanne, "International Search Report and Written Opinion", International Application No. PCT/US2023/011484, dated May 8, 2023, 17 pages.

Hughes, J., "Apache Iceberg: An Architectural Look Under the Covers", Oct. 22, 2021, retrieved Apr. 20, 2023, https://web.archive.org/web/20211022220054/https://www.dremio.com/apache-iceberg-an-architectural-look-under-the-covers/, 28 pages.

Armbrust, Michael et al., "Delta Lake: High-Performance ACID Table Storage over Cloud Object Stores", Proceedings of the VLDB Endowment, vol. 13, No. 12, Sep. 14, 2020, pp. 3411-3424.

Katz, Oz, "Hudi, Iceberg and Delta Lake: Data Lake Table Formats Compared", Apr. 12, 2021, retrieved Apr. 21, 2021, https://lakefs.io/blog/hudi-iceberg-and-delta-lake-data-lake-table-formtas-compared/, pp. 1-12.

Okraglewski, L., "Time Traveling in Data Lakes", Oct. 29, 2021, retrieved Apr. 19, 2023, https://web.archive.org/web/20211029205633/https://billennium,com/blog/time-traveling-in-data-lakes/, pp. 1-6.

Ormenisan, A.A., et al., "Time Travel and Provenance for Machine Learning Pipelines", USENIX Association, 2020 USENIX Conference on Operational Machine Learning, retrieved Feb. 4, 2021, https://www.usenix.org/system/files/opm120_full_proceedings_interior.pdf, 3 pages.

Nielsen, D., "Project Nessie: Transactional Catalog for Data Lakes with Git-like semantics", Dremio, Sep. 27, 2021, retrieved Apr. 24, 2023, https://www.dremio.com/blog/project-nessie-transactional-catalog-for-data-lakes-with-git-like-semantics/, 16 pages.

Faria, N. et al., "Towards Generic Fine-Grained Transaction Isolation in Polystores", Jan. 1, 2022, Poly 2021/ DMAH 2021, LNCS 12921, pp. 29-42.

Van Russel Delrio, Deborah, "International Search Report and Written Opinion", International Application No. PCT/US2023/011483, dated May 10, 2023, 16 pages.

* cited by examiner

VERSION CONTROL INTERFACE FOR ACCESSING DATA LAKES

BACKGROUND

A data lake is a popular storage abstraction used by the emerging class of data-processing applications. Data lakes are typically implemented on scale-out, low-cost storage systems or cloud services, which allow for storage to scale independently of computing power. Unlike traditional data warehouses, data lakes provide bare-bones storage features in the form of files or objects and may support open storage formats. They are typically used to store semi-structured and unstructured data. Files (objects) may store table data in columnar and/or row format. Metadata services, often based on open source technologies, may be used to organize data in the form of tables, somewhat similar to databases, but with less stringent schema. Essentially, the tables are maps from named aggregates of fields to dynamically changing groups of files (objects). Data processing platforms use the tables to locate the data and implement access and queries.

The relatively low cost, scalability, and high availability of data lakes, however, come at the price of high latencies, weak consistency, lack of transactional semantics, inefficient data sharing, and a lack of useful features such as snapshots, clones, version control, time travel, and lineage tracking. These shortcomings, and others, create challenges in the use of data lakes by applications. For example, the lack of support for cross-table transactions restricts addressable query use cases, and high write latency performance negatively impacts real-time analytics.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for improving access to data in a data lake, using a version control interface that is implemented using an overlay file system. Example operations include: generating a first master branch for data objects stored in the data lake, the first master branch comprising a tree data structure having a plurality of leaf nodes referencing the data objects; for each writer of a plurality of writers, creating a private branch from the first master branch, wherein each private branch is configured to be written to by its corresponding writer; after creating the private branches, reading, by a plurality of readers, the data objects from the data lake using references in the first master branch; for each private branch of the created private branches, for which a merge is performed: generating a new master branch for the data stored in the data lake, wherein generating the new master branch comprises merging the private branch with the first master branch, and wherein the new master branch references a new data object written to the data lake; and after generating the new master branch, reading, by the plurality of readers, the data objects from the data lake using references in the new master branch.

BRIEF DESCRIPTION OF THE DRAWINGS

The present description will be better understood from the following detailed description read in the light of the accompanying drawings, wherein.

DETAILED DESCRIPTION

Figure 1:
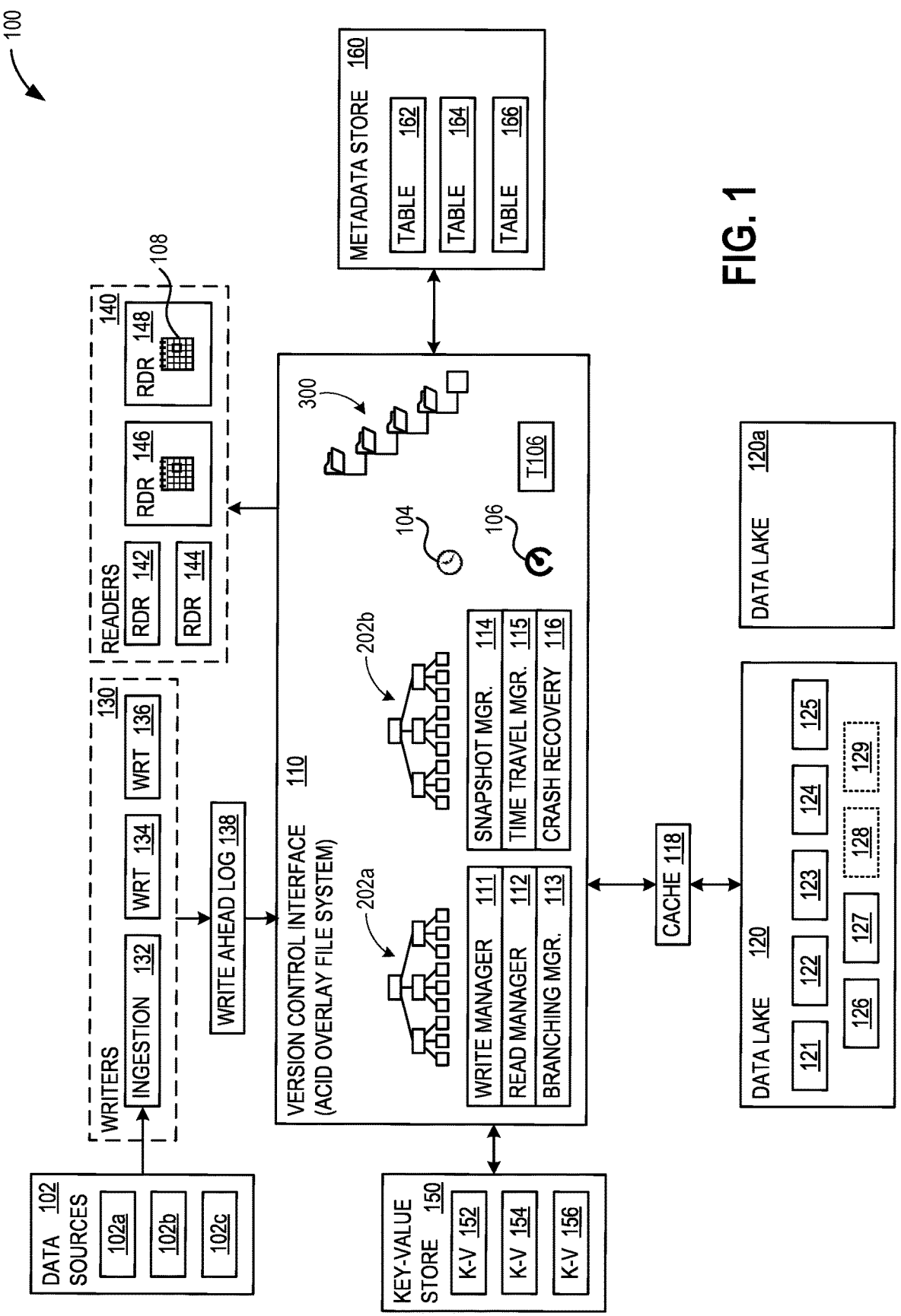
FIG. 1 illustrates an example architecture that advantageously provides a version control interface for accessing a data lake.

Aspects of the disclosure permit multiple readers and writers (e.g., clients) to access one or more data lakes concurrently at least by providing a layer of abstraction between the client and the data lake that acts as an overlay file system. The layer of abstraction is referred to, in some examples, as a version control interface for data. An example version control interface for data is a set of software components (e.g., computer-executable instructions), application programming interfaces (APIs), and/or user interfaces (UIs) that may be used to manage access (e.g., read and/or write) to data by a set of clients. One goal of such an interface is to implement well-defined semantics that facilitate the coordinated access to the data, capture the history of updates, perform conflict resolution, and other operations. A version control interface (for data) allows the implementation of higher-level processes and workflows, such as transactions, data lineage tracking, and data governance. Some of the examples are described in the context of a version control interface for data lakes in particular, but other examples are within the scope of the disclosure.

Concurrency control coordinates access to the data lake to ensure a consistent version of data such that all readers read consistent data and metadata, even while multiple writers are writing into the data lake. Access to the data is performed using popular and/or open protocols. Examples of such protocols include AWS S3, Hadoop Distributed File System interface (HDFS), etc. In a similar fashion, access to metadata services that are used to store metadata (e.g., maps from tables to files or objects) is compatible with popular and/or open interfaces, for example the Hive Metastore Interface (HMS) API. The terms object, data object, and file are used interchangeably herein.

Common query engines may be supported, while also enabling efficient batch and streaming analytics workloads. Federation of multiple heterogeneous storage systems is supported, and data and metadata paths may be scaled independently and dynamically, according to evolving workload demands. Transactional atomicity, consistency, isolation, and durability (ACID) semantics may be provided using optimistic concurrency control, which also provides versioning, and lineage tracking for data governance functions. This facilitates tracing the lifecycle of the data from source through modification (e.g., who performed the modification, and when).

In some examples, this is accomplished by leveraging branches, which are isolated namespaces that are superimposed on data objects (files) that constitute tables. Reads are serviced using a master branch, while data is written (e.g., ingested as a stream from external data sources) using multiple private branches. Aspects of the disclosure improve the reliability and management of computing operations at least by creating a private branch for each writer, and then generating a new master branch for the data stored in a data lake by merging the private branch into a new master branch. Readers then read the data objects from the data lake using references in the new master branch.

In some examples, a master branch is a long-lived branch (e.g., existing for years, or indefinitely). The master branch includes a set (e.g., list) of snapshots, each of which obey conflict resolution policies in place at the time the snapshot was taken. The snapshots may be organized in order of creation. A private branch is a fork from the master branch to facilitate read and/or write operations in an isolated way. A private branch may also act as a write buffer for streaming data. Private branches are often short-lived, existing for the duration of the execution of some client-driven workflow, e.g., a number of operations or transactions, before being merged back into the master branch.

To write to the data lake, whether in bulk (e.g., ingest streams of large number of rows) or individual operation (e.g., a single row or a few rows), a writer checks out a private branch and may independently create or write data objects in that branch. That data does not become visible to other clients (e.g., other writers and readers). Once a user determines that enough data is written to the private branch (or based on resource pressure or a timer event, as described herein), the new data is committed, which finalizes it in the private branch. Even after a commit, the new data remain visible only in the writer's private branch. Readers have access only to a public master branch. To ensure correctness, a merging process occurs from the private branches to the master branch thus allowing the new data to become publicly visible in the master branch. This enables a consistent and ordered history of writes.

FIG. 1 illustrates an architecture 100 that advantageously improves access to data lakes with a version control interface 110 (e.g., a file overlay system) for accessing a data lake 120. In some examples, version control interface 110 overlays multiple data lakes 120 (e.g., data lake 120 and data lake 120a), providing data federation (e.g., a process that allows multiple databases to function as a single database). A write manager 111 and a read manager 112 provide a set of application programming interfaces (APIs) for coordinating access by a plurality of writers 130 and a plurality of readers 140. Writers 130 and readers 140 include, for example, processes that write and read, respectively, data to/from data lake 120. Version control interface 110 leverages a key-value (K-V) store 150 and a metadata store 160 for managing access to the master branch, as described in further detail below. A master branch 200 is illustrated and described in further detail in relation to FIG. 2A, and a notional data partitioning structure 300, representing the hierarchical namespace of the overlay file system, is illustrated and described in further detail in relation to FIG. 3.

Figure 10:
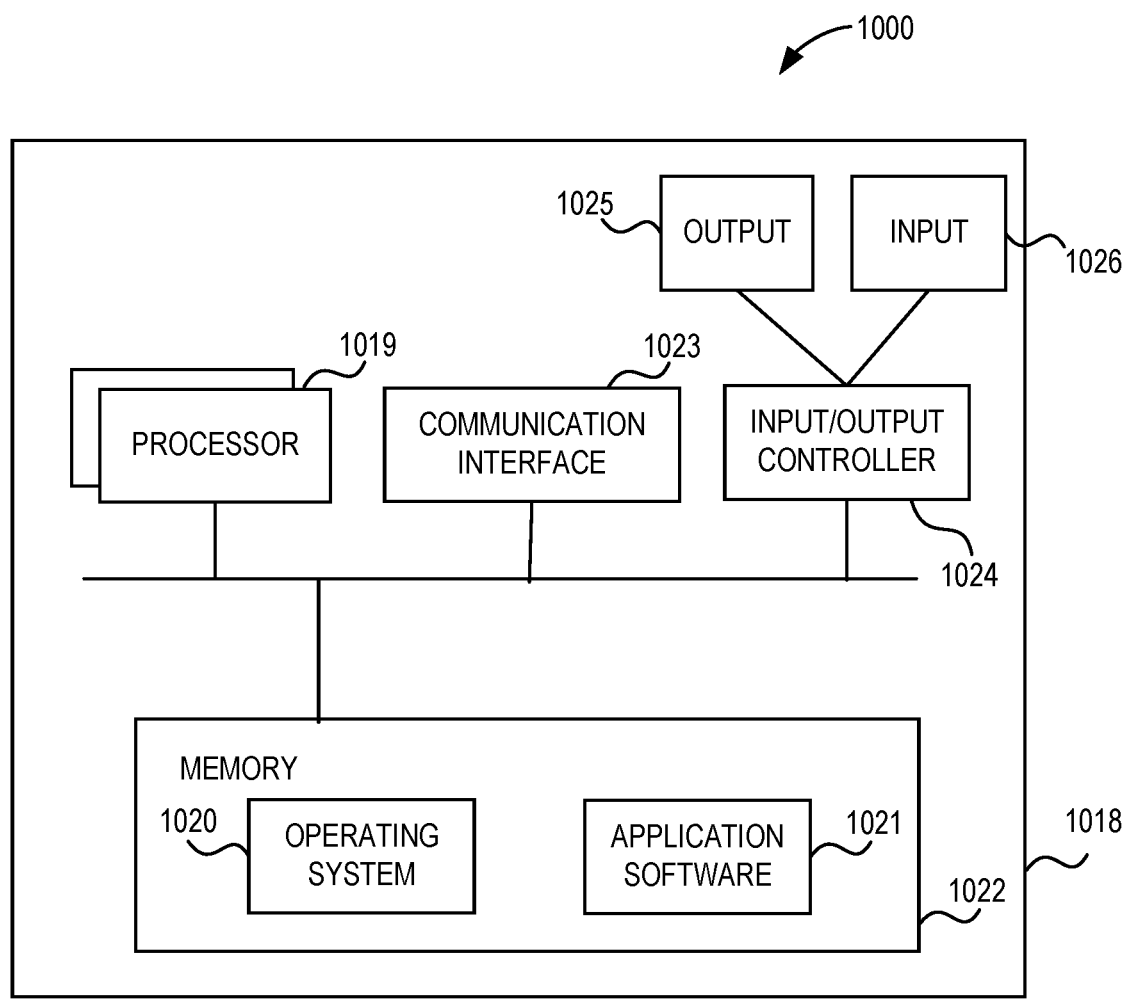
FIG. 10 illustrates a block diagram of a computing apparatus that may be used as a component of the architecture of FIG. 1, according to an example.

In some examples, architecture 100 is implemented using a virtualization architecture, which may be implemented on one or more computing apparatus 1018 of FIG. 10. An example computing framework on which the components of FIG. 1 may be implemented and executed uses a combination of virtual machines, containers, and serverless computing abstractions. Example storage on which the data lake may be implemented is a cloud storage service, or a hardware/software system. The storage can be a file system or an object storage system.

Data lake 120 holds multiple data objects, illustrated at objects 121-129. Objects 128 and 129 are shown with dotted lines because they are added to data lake 120 at a later time by writer 134 and writer 136, respectively. Data lake 120 also ingests data from data sources 102, which may be streaming data sources, via an ingestion process 132 that formats incoming data as necessary for storage in data lake 120. Data sources 102 is illustrated as comprising a data source 102a, a data source 102b, and a data source 102c. Objects 121-129 may be structured data (e.g., database records), semi-structured (e.g., logs and telemetry), or unstructured (e.g., pictures and videos).

Inputs and outputs are handled in a manner that ensures speed and reliability. Writers 130, including ingestion process 132, writer 134, and writer 136, leverage a write ahead log (WAL) 138 for crash resistance, which in combination with the persistence properties of the data lake storage, assists with the durability aspects of ACID. For example, in the event of a crash (e.g., software or hardware failure), crash recovery 116 may replay WAL 138 to reconstruct messages. WAL 138 provides both redo and undo information, and also assists with atomicity. In some examples, version control interface 110 uses a cache 118 to interface with data lake 120 to speed up operations (or multiple data lakes 120, when version control interface 110 is providing data federation). Write manager 111 manages operations involving writers 130. Although write manager 111 is illustrated as a single component, it may be implemented using a set of distributed functionality, similarly to other illustrated components of version control interface 110 (e.g., read manager 112, branching manager 113, snapshot manager 114, time travel manager 115, and crash recovery 116).

A metadata store 160 organizes data (e.g., objects 121-129) into tables, such as a table 162, table 164, and a table 166. Tables 162-166 may be stored in metadata store 160 and/or on compute nodes (see FIG. 4) hosting an implementation of version control interface 110. A table provides a hierarchical namespace, typically organized by a default partitioning policy of some of the referenced data attributes, e.g., the date (year/month/day) of the data creation, as indicated for data partitioning structure 300 in FIG. 3. For example, a partition holds data objects created in a specific day. In either case, the database is accessible through a standard open protocol. For example, if one of readers 140 performs a query using a structured query language (SQL) statement that performs a SELECT over a range of dates, then the organization of data partitioning structure 300 indicates the appropriate directories and data objects in the overlay file system to locate the partitions from which to read objects.

Data may be written in data lake 120 in the form of transactions This ensures that all of the writes are manifested at the same time (e.g., available for reading by others), so that either all of the data included in the transaction may be read by others (e.g., a completed transaction) or none of the data in the transaction may be read by others (e.g., an aborted transaction). Atomicity guarantees that each transaction is treated as a single unit, which either succeeds completely, or fails completely. Consistency ensures that a transaction can only transition data from one valid state to another. Isolation ensures that concurrent execution of transactions leaves the data in the same state that would have been obtained if the transactions were executed sequentially. Durability ensures that once a transaction has been committed, it will remain committed even in the case of a system failure (e.g., power outage or crash). Optimistic concurrency control assumes that multiple transactions can frequently complete without interfering with each other.

Figure 2A:
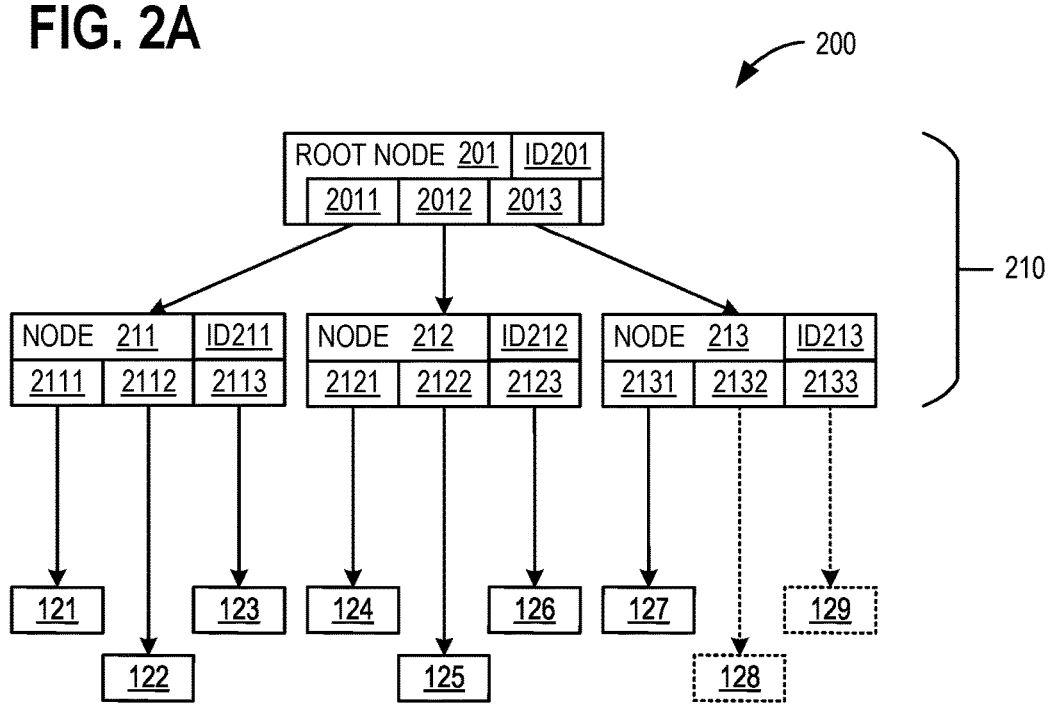
FIGS. 2A and 2B illustrate examples of master branches, as may be used by the architecture of FIG. 1.

Tables 162-166 may be represented using a tree data structure 210 of FIG. 2A. Turning briefly to FIG. 2A, a master branch 200 comprises a root node 201, which is associated with an identifier ID201, and contains references 2011-2013 to lower nodes 211-213. The identifiers, such as identifier ID201 are any universally unique identifiers (UUIDs). One example of a UUID is a content-based UUID. A content-based UUID has an added benefit of content validation. One example of a content-based UUID includes a Merkle tree, but any cryptographically unique ID is suitable. Aspects of the disclosure are operable with any UUID, and are not limited to Merkle trees, hash values, or other content-based UUIDs.

If content-based UUIDs are used, then a special reclamation process is required to delete nodes that are not referenced anymore by any nodes in the tree. Nodes may be metadata nodes or actual data objects (files/objects) in the storage. Such reclamation process uses a separate data structure, such as a table, to track the number of references to each node in the tree. When updating the tree, including with a copy-on-write method, the table entry for each affected node has to be updated atomically with the changes to the tree. When a node A is referenced by a newly created node B, then the reference count for node A in the table is incremented. When a node B that references node A is deleted, for example because the only snapshot where node B exists is deleted, then the reference count of node A in the table is decremented. A node is deleted from storage when its reference count in the table drops to zero.

In a content-based UUID example, identifier ID201 comprises the hash of the node 201, which contains the references to nodes 211-213. Node 211, which is associated with an identifier ID211, has reference 2111, reference 2112, and reference 2113 (e.g., addresses in data lake 120) to data object 121, data object 122, and data object 123, respectively. In some examples, identifier ID211 comprises a hash value of the content of the node, which includes references 2111-2113. For example, in intermediate nodes, the contents are the references to other nodes. The hash values may also be used for addressing the nodes in persistent storage. Those skilled in the art will note that the identifiers need not be derived from content-based hash values but could be randomly generated, while still content-based hash values in the nodes may be used for data verification purposes.

Node 212, which is associated with an identifier ID212, has reference 2121, reference 2122, and reference 2123 (e.g., addresses in data lake 120) to data object 124, data object 125, and data object 126, respectively. In some examples, identifier ID212 comprises a hash value of references 2121-2133. Node 213, which is associated with an identifier ID213, has reference 2131, reference 2132, and reference 2133 (e.g., addresses in data lake 120) to data object 127, data object 128, and data object 129, respectively. In some examples, identifier ID213 comprises a hash value of references 2131-2133. In some examples, each node holds a component of the name space path starting from the table name (see FIG. 3). Nodes are uniquely identifiable by their hash value (e.g., identifiers ID201-ID213). In some examples, tree data structure 210 comprises a Merkle tree, which is useful for identifying changed data, and facilitates versioning and time travel. However, aspects of disclosure are operable with other forms of tree data structure 210. Further, the disclosure is not limited to hash-only IDs (e.g., Merkel tree). However, hashes may be stored for verification.

The tree data structure 210 may be stored in the data lake or in a separate storage system. That is, the objects that comprise the overlayed metadata objects do not need to be stored in the same storage system as the data itself. For example, the tree data structure 210 may be stored in a relational database or key-value store.

Master branch 200 is a relational designation indicating that other branches (e.g., private branches, see FIG. 4) are copied from it and merged back into it. In some examples, a merge process iterates through new files, changed files, and deleted files in the private branch, relative to what had been in master branch when the merging private branch had been forked, to identify changes. The merging process also identifies changes made to the master branch (e.g., comparing the current master branch with the version of the master branch at the time of forking) concurrently with changes happening in a private branch. For all of the identified changes, the files (data objects) are compared to the files at the same paths in master branch 200 to determine if a conflict exists. If there is a conflict, a conflict resolution solution is implemented. Aspects of the disclosure are operable with multiple conflict resolution policies. Example conflict resolution policies include, but are not limited to, the following: always accepting changes from the private branch; forbidding the merge and requesting that the private branch rebase (abort and retry: refork and reapply changes to the current master branch) for conflicts; and reading files from one private branch and writing them to another private branch. The present application is not limited to these example conflict resolution policies, and is operable with other policies, algorithms, strategies, and solutions. Some examples employ more than one of these conflict resolution solutions and select a specific solution on a per-transaction basis.

Figure 2B:
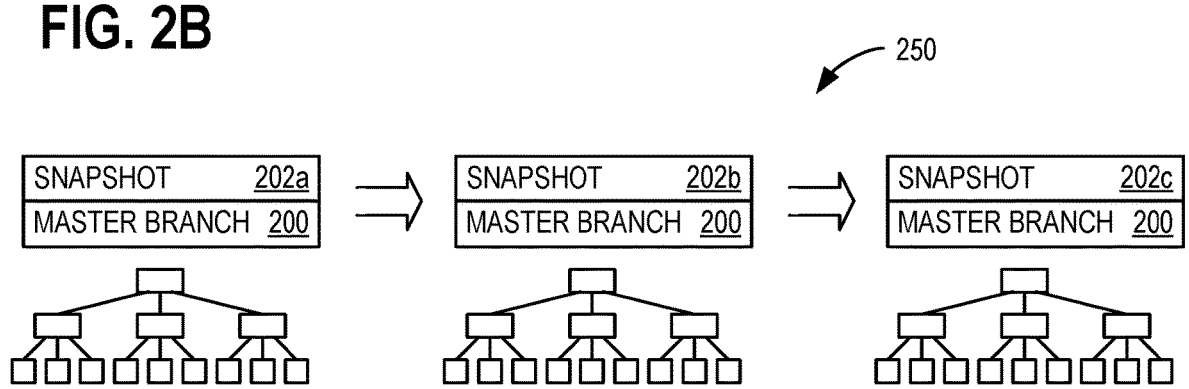

Since master branch 200 is constantly changing, various versions are captured in snapshots, as shown in FIG. 2B. A snapshot is a set of reference markers for data at a particular point in time. In relation to master branch 200, a snapshot is an immutable copy of the tree structure, whereas a branch (e.g., a private branch of FIG. 4) is a mutable copy. A snapshot is uniquely identified by its unique root node for that instance. Each snapshot acts as an immutable point-in-time view of the data. A history of snapshots may be used to provide access to data as of different points in time and may be used to access data as it existed at a certain point in time (e.g., rolled back in time).

To enable concurrent readers and writers, snapshots are used to create branches. Some examples use three types of branches: a master branch (only one exists at a time) that is used for reading both data and metadata at a consistent point in time, a private branch (multiple may exist concurrently) that acts as a write buffer for streaming transactions and excludes other readers, and a workspace branch (multiple may exist concurrently) that facilitates reads and writes for certain transactions. The master branch is updated atomically only by merging committed transactions from the other two types of branches. Readers use either the master branch to read committed data or a workspace branch to read in the context of an ongoing transaction. Writers use either a private branch or a workspace branch to write, depending on the type of workload, ingestion, or transactions respectively. Private and workspace branches may be instantiated as snapshots of the master branch by copying the root node of the tree (e.g., the base). In some examples, writers use copy-on-write (COW) to keep the base immutable for read operations (Private branches) and for merging. Copy-on-write (CoW) is a technique to efficiently create a copy of a data structure without time consuming and expensive operations at the moment of creating the copy. If a unit of data is copied but not modified, the "copy" may exist merely as a reference to the original data, and only when the copied data is modified is a physical copy created so that new bytes may be written to memory or storage.

FIG. 2B shows an example in which a master branch 200 passes through three versions, with a snapshot created for each version. The active master branch 200 is also mutable, as private branches are merged into the current master branch. Merging involves incorporating new nodes and data from a private branch into the master branch, replacing equivalent nodes (having old contents), adding new nodes, and/or deleting existing nodes. However, there are multiple snapshots of master branch 200 through which the evolution of the data over time may be tracked. Read operations that are not part of a transaction may be served from a snapshot of the master branch. Typically, reads are served from the most recent master branch snapshot, unless the read is targeting an earlier version of the data (e.g., time travel). A table may comprise multiple files that are formatted for storing a set of tuples, depending on the partitioning scheme and lifetime of a private branch. In some examples, a new file is created when merging a private branch. A read may be serviced using multiple files, depending on the time range on the read query. In some examples, parquet files are used. In some examples, a different file format is used, such as optimized row columnar (ORC), or Avro.

Master branch snapshot 202a is created for master branch 200, followed by a master branch snapshot 202b, which is then followed by a master branch snapshot 202c. Master branches 202a-202c reflect the content of master branch 200 at various times, in a linked list 250, and are read-only. Linked list 250 provides tracking data lineage, for example, for data policy compliance. In some examples, mutable copies of a branch snapshot may be created that can be used for both reads and writes. Some examples store an index of the linked list in a separate data base or table in memory to facilitate rapid queries on time range, modified files, changes in content, and other search criteria.

Figure 4:
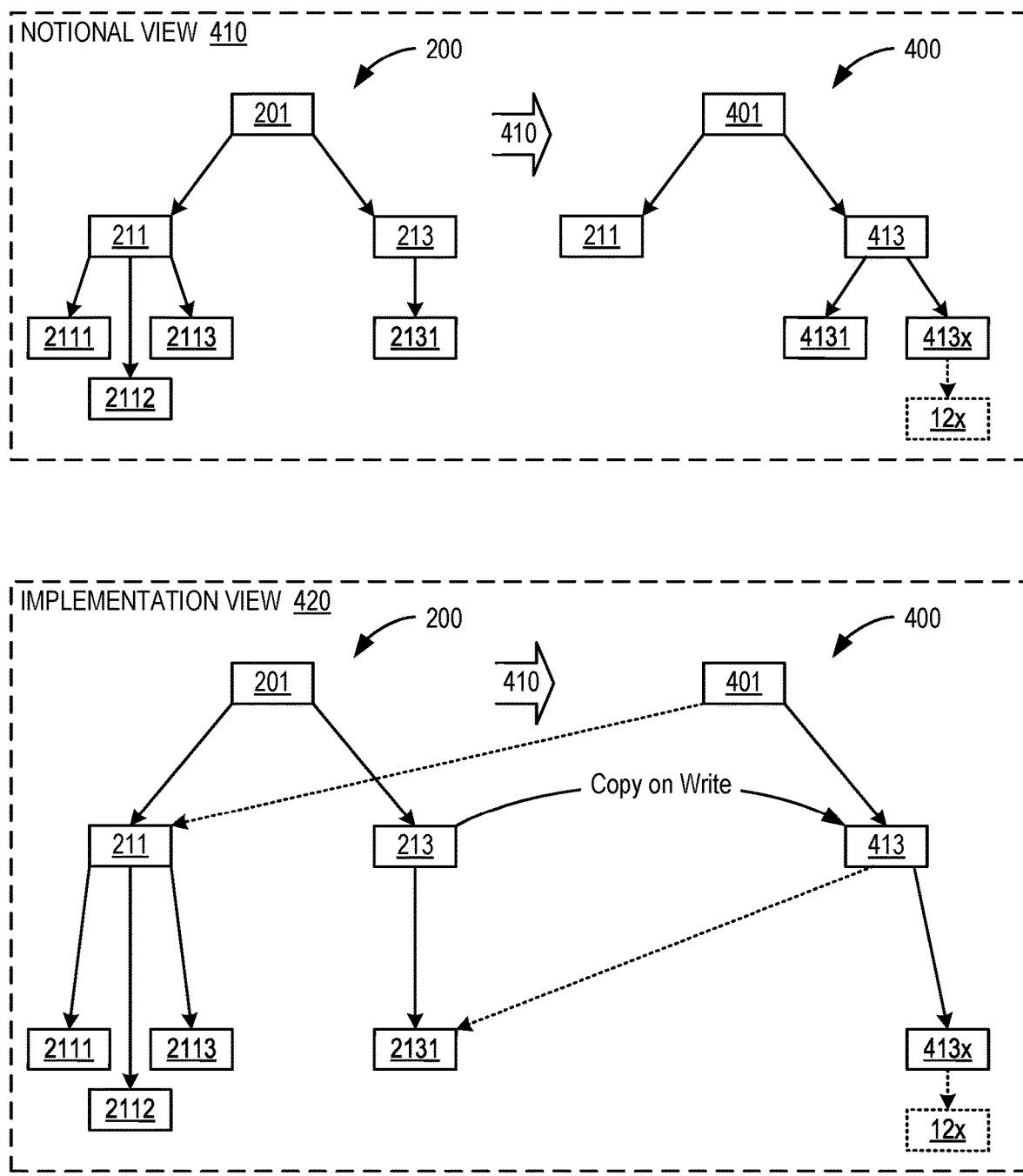
FIG. 4 illustrates example generation of a private branch from a master branch, as may occur when using the architecture of FIG. 1.
Figure 6A:
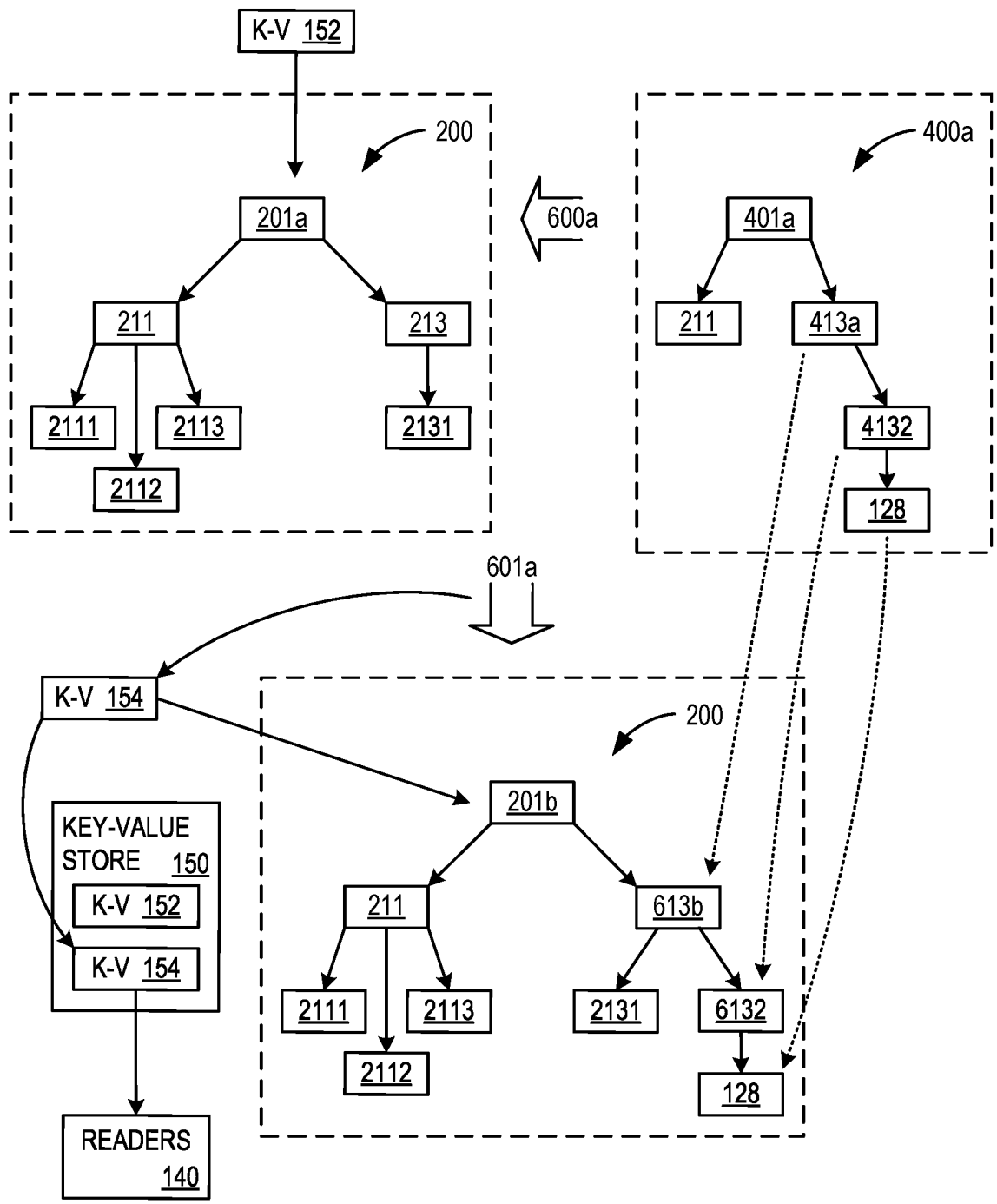
FIGS. 6A and 6B illustrate an example of sequentially merging private branches back into the master branch, as may occur when using the architecture of FIG. 1.
Figure 6B:
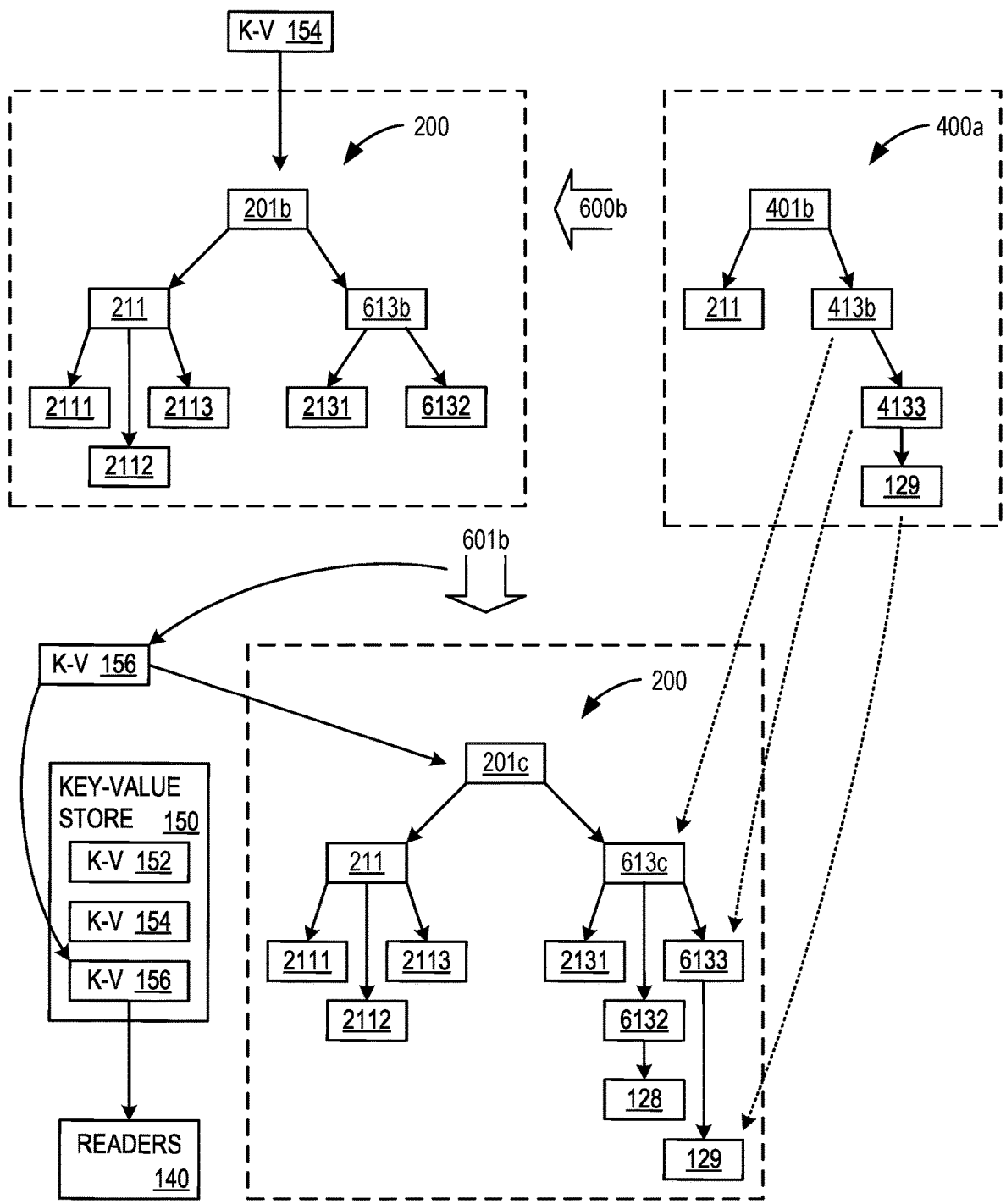

Returning to FIG. 1, branching is handled by branching manager 113, as illustrated in FIGS. 4, 6A and 6B. A snapshot manager 114 handles the generation of master branch snapshots 202a-202c. New master branches are created upon merging data from a private branch. A private branch is merged with the master branch when it contains data of committed transactions (e.g., a private branch cannot be merged with the master, if it contains data of an uncommitted transaction). There may be different policies used for merging private branches to the master branch. In some examples, as soon as a single transaction commits, the private branch on which the transaction was executed is merged with the master branch. In some examples, multiple transactions may commit in a private branch before that branch is merged to the master. In such examples, the merging occurs in response to one of the following triggers: (1) a timer 104 expires; (2) a resource monitor 106 indicates that a resources usage threshold T106 is met (e.g., available memory is becoming low). Other merge policies may also be implemented depending on the type of a transaction or the specification of a user. Also, merging may be performed in response to an explicit merge request by a client.

Timer 104 indicates that a time limit has been met. In some scenarios, this is driven by a service level agreement (SLA) that requires data to become available to users by a time limit, specified in the SLA, after ingestion into the data lake or some other time reference. Specifying a staleness requirement involves a trade-off of the size of some data objects versus the time lag for access to newly ingested data. In general, larger data objects mean higher storage efficiency and query performance. If aggressive timing (e.g., low lag) is preferred, however, some examples allow for a secondary compaction process to compact multiple small objects into larger objects, while maintaining the write order. In some examples, resource monitor 106 checks on memory usage, and resource usage threshold T106 is a memory usage threshold or an available memory threshold. Alternatively, resources other than memory may be monitored.

Version control interface 110 atomically switches readers to a new master branch (e.g., switches from master branch snapshot 202a to master branch snapshot 202b or switches from master branch snapshot 202b to master branch snapshot 202c) after merging a private branch back into a master branch 200 (as shown in FIGS. 6A and 6B). Consistency is maintained during these switching events by moving all readers 140 from the prior master branch to the new master branch at the same time, so all readers 140 see the same version of data. To facilitate this, a key-value store 150 has a key-value entry for each master branch, as well as key-value entries for private branches. The key-value entries are used for addressing the root nodes of branches. For example, a key-value pair 152 points to a first version of master branch 200 (or master branch snapshot 202a), a key-value pair 154 points to a second version of master branch 200 (or master branch snapshot 202b, and a key-value pair 156 points to a third version of master branch 200 (or master branch snapshot 202c). In some examples, key-value store 150 is a distributed key-value store. In operation, key-value store 150 maps versions or snapshot heads to the node ID needed to traverse that version once it was committed and flushed.

A two-phase commit process, which requires key value tagging on reads, will leverage key-value store 150 when the group of tables, also known as a data group, spans multiple compute nodes and coordination between the different compute nodes is needed. Key-value store 150, which knows the latest key value pair to tag, facilitates coordination. Additionally, Each of readers 140 may use one of key-value pairs 152, 154, or 156 when time traveling (e.g., looking at data at a prior point in time), to translate a timestamp to a hash value, which will be the hash value for the master branch snapshot at that time point in time. A key-value store is a data storage paradigm designed for storing, retrieving, and managing associative arrays. Data records are stored and retrieved using a key that uniquely identifies the record and is used to find the associated data (values), which may include attributes of data associated with the key. The key-value store may be any discovery service. Examples of a key-value store include ETCD (which is an open source, distributed, consistent key-value store for shared configuration, service discovery, and scheduler coordination of distributed systems or clusters of machines), or other implementations using algorithms such as PAXOS, Raft and more.

There is a single instance of a namespace (master branch 200) for each group of tables, in order to implement multi-table transactions. In some examples, to achieve global consistency for multi-table transactions, read requests from readers 140 are routed through key-value store 150, which tags them by default with the current key-value pair for master branch 200 (or the most recent master branch snapshot). Time travel, described below, is an exception, in which a reader instead reads objects 121-129 from data lake 120 using a prior master branch snapshot (corresponding to a prior version of master branch 200).

Readers 140 are illustrated as including a reader 142, a reader 144, a reader 146, and a reader 148. Readers 142 and 144 are both reading from the most recent master branch, whereas readers 146 and 148 are reading from a prior master branch. For example, if the current master branch is the third version of master branch 200 corresponding to master branch snapshot 202c (pointed to by key-value pair 156), readers 142 and 144 use key-value pair 156 to read from data lake 120 using the third version of master branch 200 or master branch snapshot 202c. However, reader 146 instead uses key-value pair 154 to locate the root node of master branch snapshot 202b and read from there, and reader 148 uses key-value pair 152 to locate and read from master branch snapshot 202a. Time-travel by readers 146 and 148 is requested using a time controller 108, and permits running queries as of a specified past date. Time controller 108 includes computer-executable instructions that permit a user to specify a date (or date range) for a search, and see that data as it had been on that date.

Figure 3:
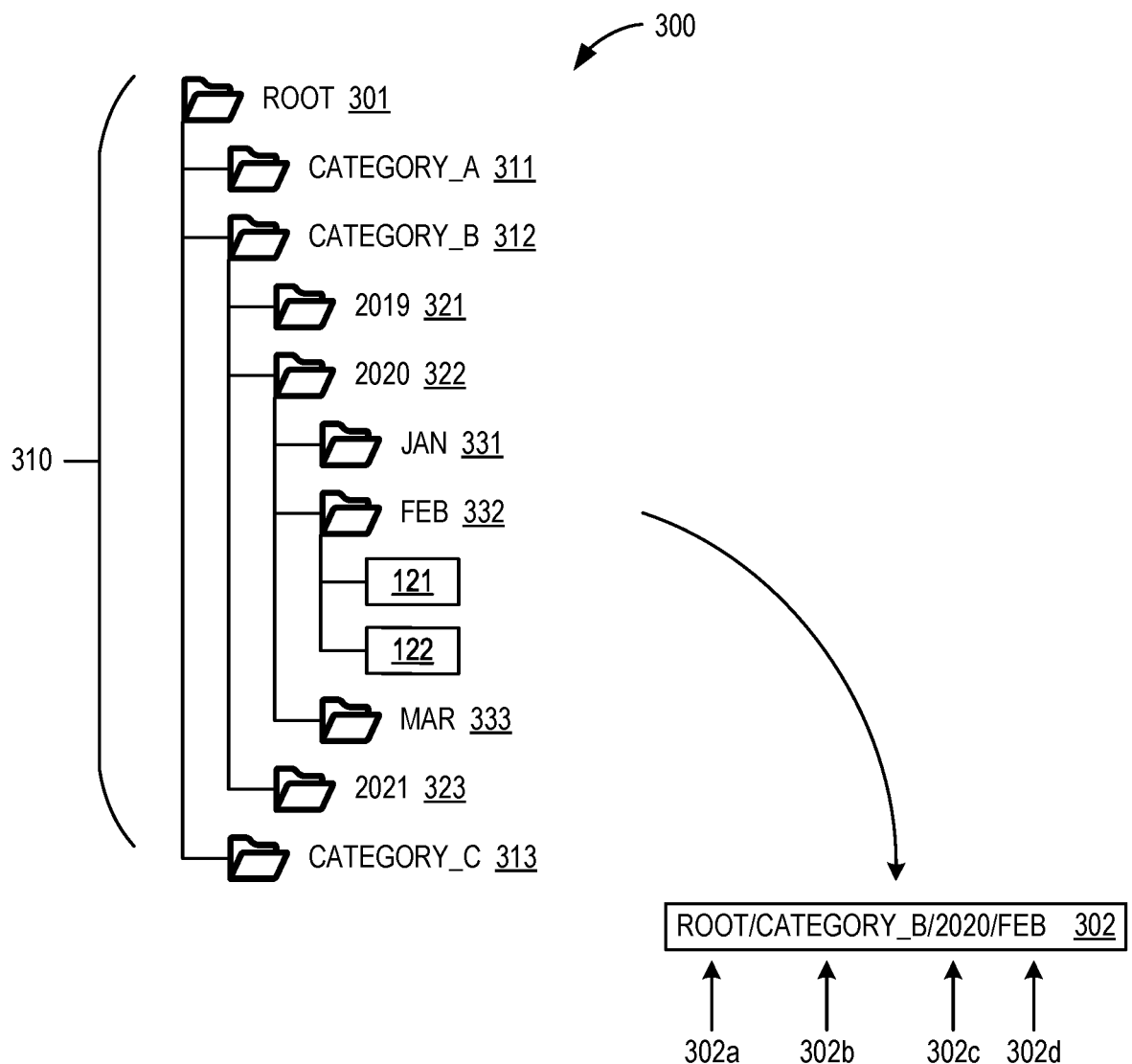
FIG. 3 illustrates an example data partitioning structure, as may be used by the architecture of FIG. 1.

FIG. 3 illustrates further detail for data partitioning structure 300, which is captured by the hierarchical namespace of the overlay file system (version control interface 110). Partitioning is a prescriptive scheme for organizing tabular data in a data lake file system. Thus, data partitioning structure 300 has a hierarchical arrangement 310 with a root level folder 301 and a first tier with folders identified by a data category, such as a category_A folder 311, a category_B folder 312, and a category_C folder 313. Category_B folder 312 is shown with a second tier indicating a time resolution of years, such as a year-2019 folder 321, a year-2020 folder 322, and a year-2021 folder 323. Year-2020 folder 322 is shown with a third tier indicating a time resolution of months, such as a January (Jan) folder 331 and a February (Feb) folder 332. Feb folder 332 is shown as having data object 121 and data object 122. In some examples, pointers to data objects are stored in the contents of directory nodes.

The names of the folders leading to a particular object are path components of a path to the object. For example, stringing together a path component 302a (the name of root level folder 301), a path component 302b (the name of category_B folder 312), a path component 302c (the name of year-2020 folder 322), and a path component 302d (the name of Feb folder 332), gives a path 302 pointing to data object 121.

FIG. 4 illustrates generation of a private branch 400 from master branch 200, for example, using CoW. In some examples, when a private branch is checked out, a new snapshot is created. For clarity, node 212 and the leaf nodes under node 212 are not shown in FIG. 4. In a private branch generation process, root node 20, node 211, node 213, and reference 2131 of master branch 200 are copied as root node 401, node 411, node 413, and node 4131 of private branch 400, respectively. This is shown in notional view 410. Using CoW, in implementation view 420, it can be seen that node 411 is actually just a pointer to node 211 of master branch 200, and node 4131 is actually just a pointer to reference 2131 of master branch 200. Nothing below node 211 is copied, because no data in that branch (e.g., under node 211) is changed. Similarly, nothing below reference 2131 is copied, because no data in that branch is changed. Therefore, the hash values of node 211 and reference 2131 will not change.

However, new data is added under node 413, specifically a reference 413x that points to newly-added data object 12x (e.g., 128 or 129, as will be seen in FIGS. 6A and 6B). Thus, the hash values of node 413 will be different than the hash value of node 213, and the hash value of root node 401 will be different than the hash value of root node 201. However, until a merge process is complete, and readers are provided the new key-value pair for the post-merge master branch, none of readers 140 are able to see root node 401, node 403, node 403x, or data object 12x.

Figure 5:
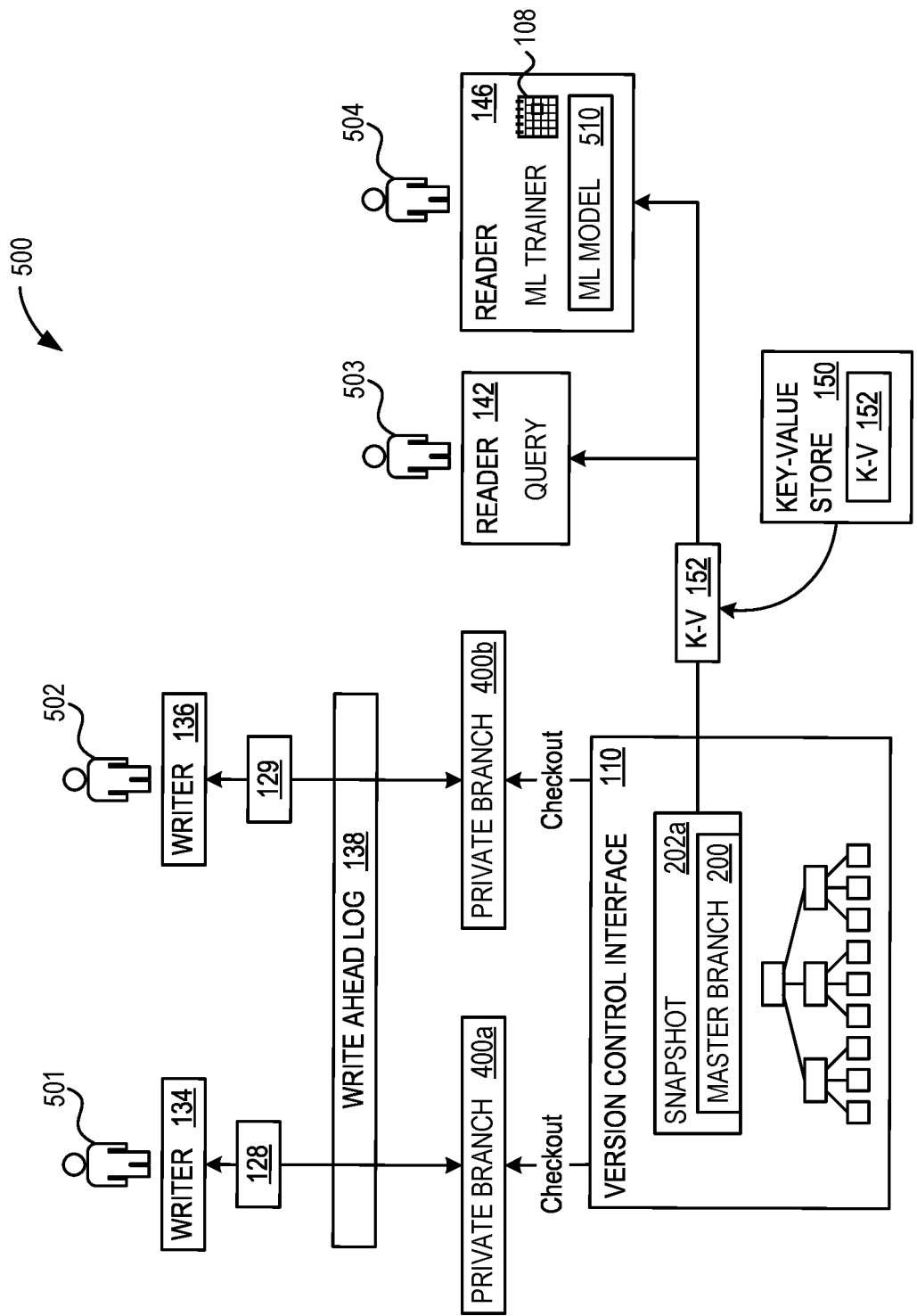
FIG. 5 illustrates example concurrent writing to private branches by a plurality of writers while concurrently reading from a master branch, as may occur when using the architecture of FIG. 1.

FIG. 5 illustrates a scenario 500 involving concurrent writing to private branches 400a and 400b by a plurality of writers (e.g., writers 134 and 136), while a plurality of readers (e.g., readers 142 and 146) concurrently read from master branch 200. Private branch 400a is checked out from version control interface 110 (copied from master branch snapshot 202a). Writer 134, operated by a user 501, writes data object 128, thereby updating private branch 400a. Similarly, private branch 400b is checked out from version control interface 110 (also copied from master branch snapshot 202a). Writer 136, for example operated by a user 502, writes data object 129, thereby updating private branch 400b. Writers 134 and 136 use WAL 138 for crash resistance. For example, when writers 134 and 136 check out private branches 400a and 400b from master branch 200 (by copying from snapshot 202a), objects 128 and 129 may be added by first writing to WAL 138 and then reading from WAL 138 to add objects 128 and 129 to private branches 400a and 400b, respectively. This improves durability (of ACID).

While writers 134 and 136 are writing their respective data, readers 142 and 146 both use key-value pair 152 to access data in data lake 120 using master branch 200. While new transactions fork from master branch 200, some examples implement workspaces that permit both reads and writes. Prior to the merges of FIGS. 6A and 6B, neither reader 142 nor reader 146 is yet able to see data object 128 or data object 129, even if both objects 128 and 129 are already in data lake 120. As indicated in FIG. 5, reader 142, operated by a user 503, is performing a query (e.g., using a query language), and reader 146, operated by a user 504, is a machine learning (ML) trainer that is training an ML model 510, using time travel. For example, reader 146 may train ML model 510 using data from a time period back in time, and then assess the effectiveness of the training by providing more recent input into the ML model 510 and comparing the results (e.g., output) with current data (using the current master branch). This allows evaluation of the effectiveness, accuracy, etc. of the ML model 510.

As described above with reference to FIG. 1, version control interface 110 overlays multiple data lakes 120 (e.g., data lake 120 and data lake 102a), providing data federation (e.g., a process that allows multiple databases to function as a single database). Version control interface 110 leverages key-value (K-V) store 150 and metadata store 160 for managing access to the master branch.

In some examples, multiple writers concurrently write to a private branch. In other examples, there is a one-to-one mapping of writers to private branches.

FIGS. 6A and 6B illustrate sequentially merging private branches 400a and 400b back into master branch 200. This is illustrated as merging private branch 400a into master branch 200, to produce a new version of master branch 200

(FIG. 6A) and then merging private branch 400b into master branch 200, to produce another new version of master branch 200 (FIG. 6B). When merging private branches, modified nodes of master branch 200 are re-written. The other nodes are overlaid from the previous version of master branch 200. The new root node of the master branch, with its unique hash signature, represents a consistent point-in-time snapshot of the state.

In the example of FIGS. 6A and 6B, the numbers of the nodes change because the parquet files are being merged, and new parquet files are being generated. This is an example of compaction, which is not required to commit. Aspects of the disclosure are operable with other implementations, such as interleaving existing parquet files without merging them.

In FIG. 6A, private branch 400a has a root node 401a, a node 413a, and a reference 4132 that points to data object 128, in a merge process 600a. The new root node of master branch 200 is root node 201b. Node 213, merged with node 413a, becomes node 613b, and reference 4132 is changed to reference 6132. Whereas node 213 had only reference 2131, node 613b has both reference 2131 and reference 6132. Key-value pair 152 points to root node 201a of master branch snapshot 202a, and remains in key-value store 150 for time travel purposes. However, as part of a transaction 601a, a new key-value pair 154 is generated that points to root node 201b of master branch snapshot 202b, and is available in key-value store 150. New key-value pair 154 is made available to readers 140 to read data object 128. The process to transition from one valid state to another follows a transaction process, one example of which is (1) allocate transaction ID, (2) flush all buffered updates for nodes traversable from 201b which include the transaction ID in their name, e.g., as a prefix, (3) add mapping of commit ID to location of 201b into key-value store 150 using a key-value store transaction. In the event of a roll-back, items with that transaction ID are removed.

In FIG. 6B, private branch 400b has a root node 401b, a node 413b, and a reference 4133 that points to data object 129, in a merge process 600b. The new root node of master branch 200, in master branch 200c is root node 201c. Node 613b, merged with node 413b, becomes node 613c, and reference 4133 is changed to reference 6133. Whereas node 613b had only references 2131 and 6132, node 613c has both references 2131, 6132, and also reference 6133. Key-value pair 154 points to root node 201b of master branch snapshot 202b, and remains in key-value store 150 for time travel purposes. However, as part of a transaction 601b, a new key-value pair 156 is generated that points to root node 201c of master branch snapshot 202c, and is available in key-value store 150. New key-value pair 156 is made available to readers 140 to read data object 129.

In some examples, to atomically switch readers from one master branch to another (e.g., from readers reading master branch snapshot 202a to reading master branch snapshot 202b), readers are stopped (and drained), the name and hash of the new master branch are stored in a new key-value pair, and the readers are restarted with the new key-value pair. Some examples do not stop the readers. For scenarios in which a group of tables is serviced by only a single compute node, there is lessened need to drain the readers when atomically updating the hash value of master branch 200 (which is the default namespace from which to read the current version (state) of data from data lake 120). However, draining of readers may be needed when two-phase commits are being used (e.g., when two or more compute nodes service a group of tables). In such multi-node scenarios, readers are drained, stopped, key value store 150 is updated, and then readers resume with the new key value.

Figure 7:
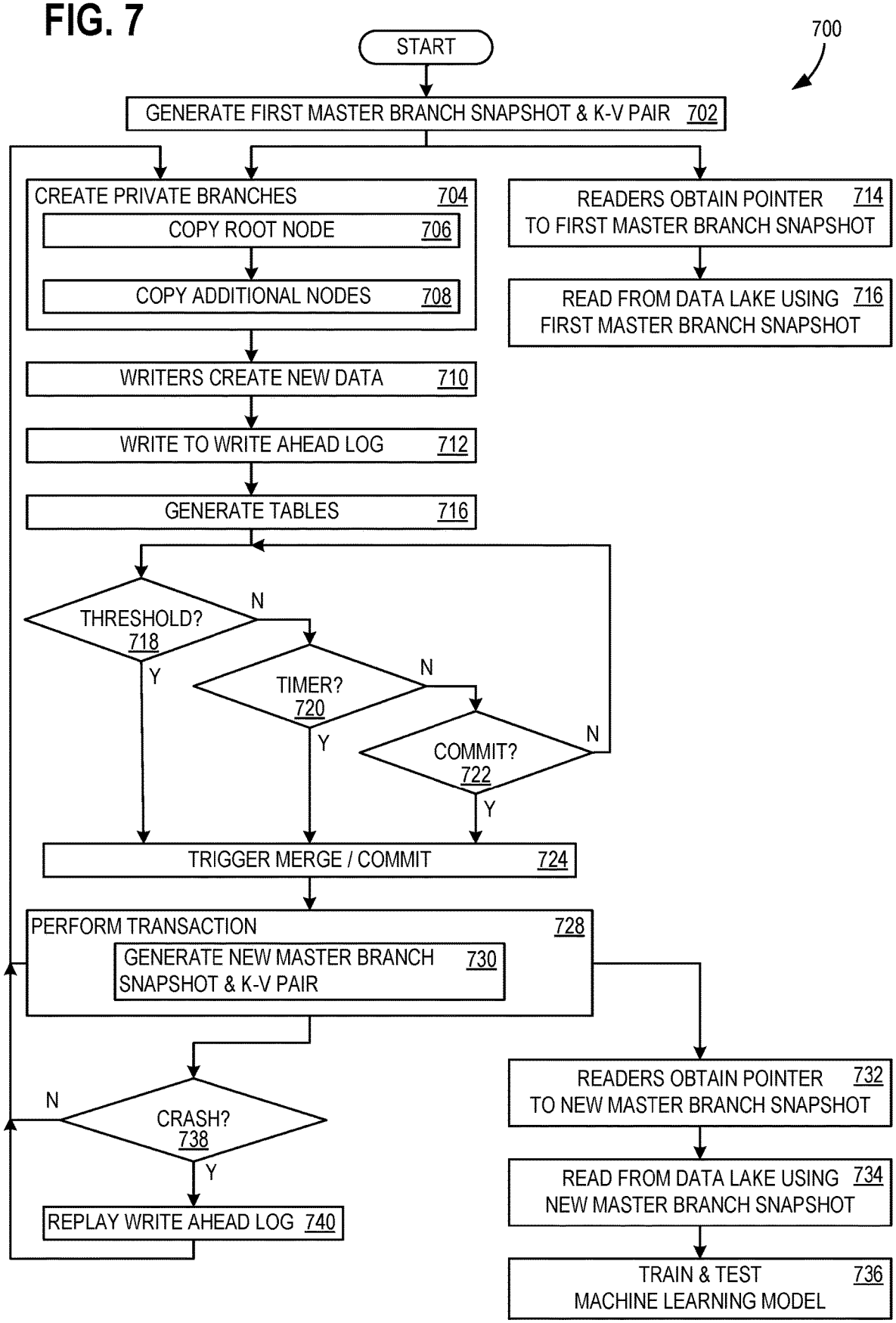
FIG. 7 illustrates a flowchart of exemplary operations associated with examples of the architecture of FIG. 1.

FIG. 7 illustrates a flowchart 700 of exemplary operations associated with architecture 100. In some examples, the operations of flowchart 700 are performed by one or more computing apparatus 1018 of FIG. 10. Flowchart 700 commences with operation 702, which includes generating master branch 200 for data objects (e.g., objects 121-127) stored in data lake 120. Master branch 200 comprises tree data structure 210 having a plurality of leaf nodes (e.g., references 2111-2133) referencing the data objects. In some examples, tree data structure 210 comprises a hash tree. In some examples, tree data structure 210 comprises a Merkle tree. In some examples, non-leaf nodes of tree data structure 210 comprise path components for the data objects.

For each writer of a plurality of writers 130 (e.g., writers 134 and 136), operation 704 creates a private branch (e.g., private branches 400a and 400b) from a first version of master branch 200. Each private branch may be written to by its corresponding writer, but may be protected against writing by a writer different than its corresponding writer. In some examples, multiple writers access a single branch and implement synchronization to their branch server, rather than using global synchronization.

In some examples, a writer of the plurality of writers 130 comprises ingestion process 132. In some examples, ingestion process 132 receives data from data source 102a and writes data objects into data lake 120. Creating a private branch is performed using operations 706 and 708, which may be performed in response to an API call. Operation 706 includes copying a root node of tree data structure 210 of master branch 200. Operation 708, implementing CoW, includes creating nodes of the private branch based on at least write operations by the writer. In some examples this may include copying additional nodes of tree data structure 210 included in a path (e.g., path 302) to a data object being generated by a writer of the private branch. The additional nodes copied from tree data structure 210 into the private branch are on-demand creation of nodes as a result of write operations.

Writers create new data in the form of data objects 128 and 129 in operation 710. Operation 712 includes writing data to WAL 138. Writers perform write operations that are first queued into WAL 138 (written into WAL 138). Then the write operation is applied to the data which, in some examples, is accomplished by reading the write record(s) from WAL 138. Operation 714 includes generating a plurality of tables (e.g., tables 162-166) for data objects stored in data lake 120. In some examples, each table comprises a set of name fields and maps a space of columns or rows to a set of the data objects. In some examples, the data objects are readable by a query language. In some examples, ingestion process 132 renders the written data objects readable by a query language. In some examples, the query language comprises SQL. Some examples partition the tables by time. In some examples, partitioning information for the partitioning of the tables comprises path prefixes for data lake 120.

Operation 714 includes obtaining, by reader 142 and reader 146, the key-value pair pointing to master branch snapshot 202a and the partitioning information for partitioning the tables in metadata store 160. Operation 716 includes reading, by readers 140, the data objects from data lake 120 using references in master branch snapshot 202a. It should be noted that while operations 714 and 716 may start prior to the advent of operation 704 (creating the private branches), they continue on after operation 704, and through operations 710-714, decision operations 718-722, and operation 724. Only after operation 728 completes are readers 142 and 146 (and other for readers 140) able to read from data lake using a subsequent version of master branch 200 (e.g., master branch snapshot 202b or master branch snapshot 202c). Decision operation 718 determines whether resource usage threshold T106 has been met. If so, flowchart 700 proceeds to operation 724. Otherwise, decision operation 720 determines whether timer 104 has expired. If so, flowchart 700 proceeds to operation 724. Otherwise, if a user commits a transaction, decision operation 722 determines that a user has committed a transaction. Lacking a trigger, flowchart returns to decision operation 718.

Operation 724 triggers a transactional merge process (e.g., transaction 601a or transaction 601b) on a writer of a private branch committing a transaction, a timer expiration, or a resource usage threshold being met. Operation 728 includes performing an ACID transaction comprising writing data objects. It should be noted that master branch snapshot 202a does not have references to the data objects written by the transaction. Such references are available only in subsequent master branches.

Operation 730 includes, for each private branch of the created private branches, for which a merge is performed, generating a new master branch for the data stored in data lake 120. For example, the second version of master branch 200 (master branch snapshot 202b) is the new master branch snapshot when master branch snapshot 202a had been current, and the third version of master branch 200 (master branch snapshot 202c) is the new master branch when master branch snapshot 202b had been current. Generating the new master branch comprises merging a private branch with the master branch. The new master branch references a new data object written to data lake 120 (e.g., master branch snapshot 202b references data object 128, and master branch snapshot 202c also references data object 129). In some examples, the new master branch is read-only. In some examples, operation 728 also includes performing a two-phase commit (2PC) process to update which version of master branch 200 (or which master branch snapshot) is the current one for reading and branching.

Repeating operations 724-730 for other private branches generates a time-series (e.g., linked list 250) of master branches for data objects stored in data lake 120. In some examples, the time-series of master branches is not implemented as a linked list, but is instead stored in a database table. Each master branch includes a tree data structure having a plurality of leaf nodes referencing a set of the data objects. Each master branch is associated with a unique identifier and a time indication identifying a creation time of the master branch. The sets of the data objects differ for different ones of the master branches. Generating the time-series of master branches includes performing transactional merge processes that merge private branches into master branches.

After generating the new master branch, operation 732 includes obtaining, by reader 142 and reader 146, the key-value pair pointing to master branch 202b (e.g., key-value pair 154) and the partitioning information for partitioning the tables in metadata store 160. Operation 734 includes reading, by readers 140, the data objects from data lake 120 using references in the second version of master branch 200 (master branch snapshot 202b). Each of readers 140 is configured to read data object 128 using references in the first or second versions of master branch 200. Each of readers 140 is configured to read data object 129 using references in the third version of master branch 200 (master branch snapshot 202c), but not the first or second versions of master branch 200.

Flowchart 700 returns to operation 704 so that private branches may be created from the new master branch, to enable further writing by writers 130. However, one example of using a master branch to access data lake 120 with time travel is indicated by operation 736, which includes training ML model 510 with data objects read from data lake 120 using references in master branch snapshot 202a. Operation 736 also includes testing ML model 510 with data objects read from data lake 120 using references in master branch snapshot 202b. Crash resistance is demonstrated with operation 740, after decision operation 738 detects a crash. Operation 740 includes, based at least on recovering from a crash, replaying WAL 138.

Figure 8:
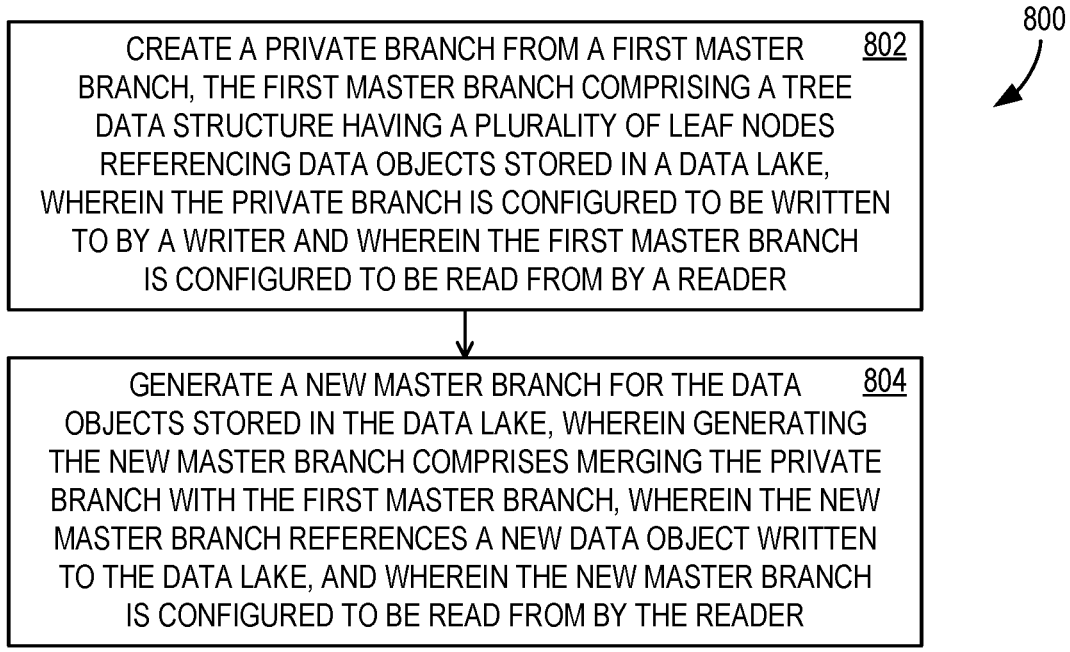
FIG. 8 illustrates another flowchart of exemplary operations associated with examples of the architecture of FIG. 1.

FIG. 8 illustrates a flowchart 800 of exemplary operations that are also associated with architecture 100. In some examples, the operations of flowchart 800 are performed by one or more computing apparatus 1018 of FIG. 10. Flowchart 800 commences with operation 802, which includes creating a private branch from a first master branch, the first master branch comprising a tree data structure having a plurality of leaf nodes referencing data objects stored in a data lake, wherein the private branch is configured to be written to by a writer and wherein the first master branch is configured to be read from by a reader. Operation 804 includes generating a new master branch for the data objects stored in the data lake, wherein generating the new master branch comprises merging the private branch with the first master branch, wherein the new master branch references a new data object written to the data lake, and wherein the new master branch is configured to be read from by the reader.

Figure 9A:
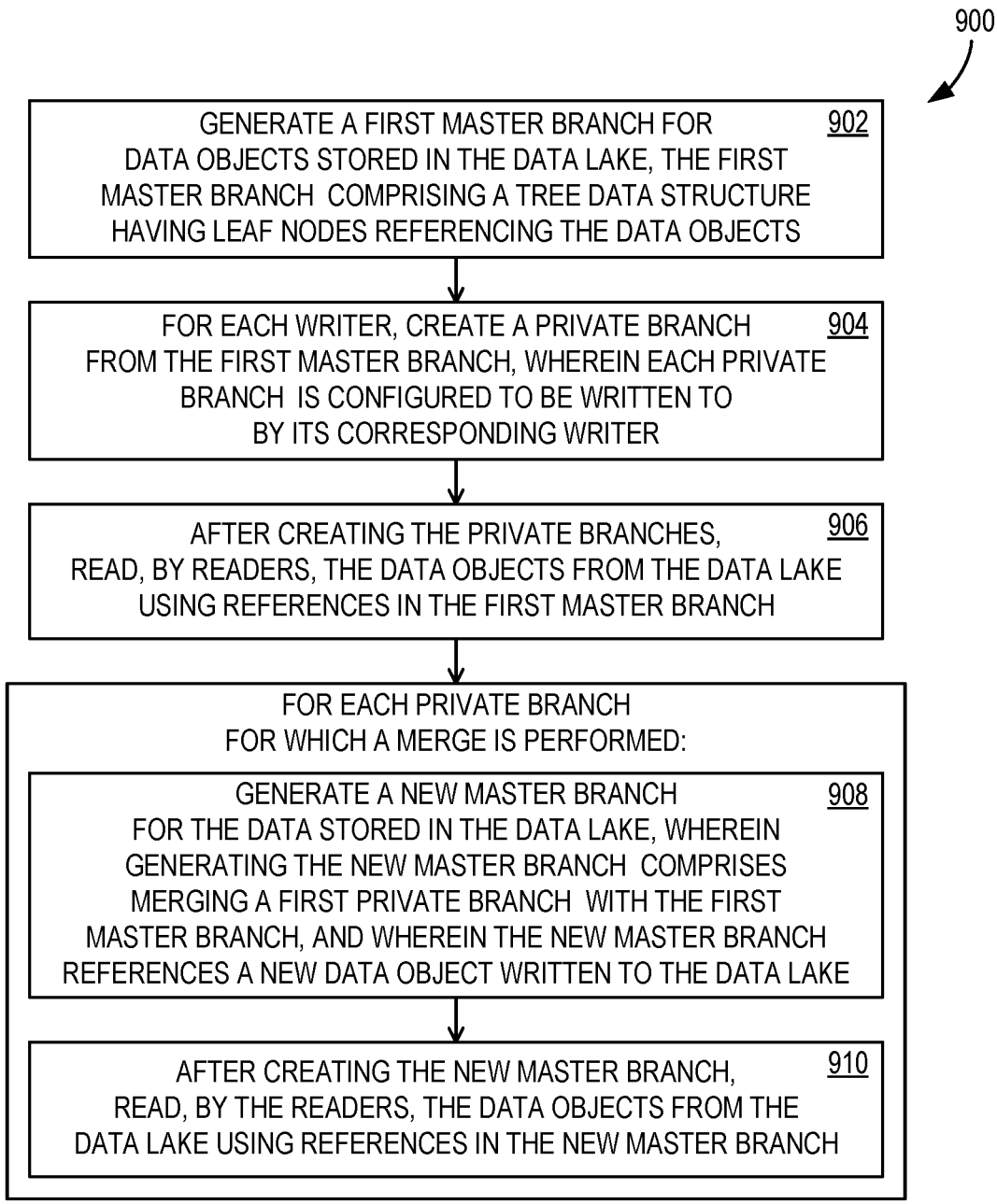
FIGS. 9A and 9B illustrate exemplary operations associated with examples of the architecture of FIG. 1.

FIG. 9A illustrates a flowchart 900 of exemplary operations that are also associated with architecture 100. In some examples, the operations of flowchart 900 are performed by one or more computing apparatus 1018 of FIG. 10. Flowchart 900 commences with operation 902, which includes generating a first master branch for data objects stored in the data lake, the first master branch comprising a tree data structure having a plurality of leaf nodes referencing the data objects. Operation 904 includes, for each writer of a plurality of writers, creating a private branch from the first master branch, wherein each private branch is configured to be written to by its corresponding writer. Operation 906 includes, after creating the private branches, reading, by a plurality of readers, the data objects from the data lake using references in the first master branch.

Operations 908 and 910 are repeated for each private branch of the created private branches, for which a merge is performed. Operation 908 includes generating a new master branch for the data stored in the data lake, wherein generating the new master branch comprises merging the private branch with the first master branch, and wherein the new master branch references a new data object written to the data lake. Operation 910 includes, after generating the new master branch, reading, by the plurality of readers, the data objects from the data lake using references in the new master branch.

Figure 9B:
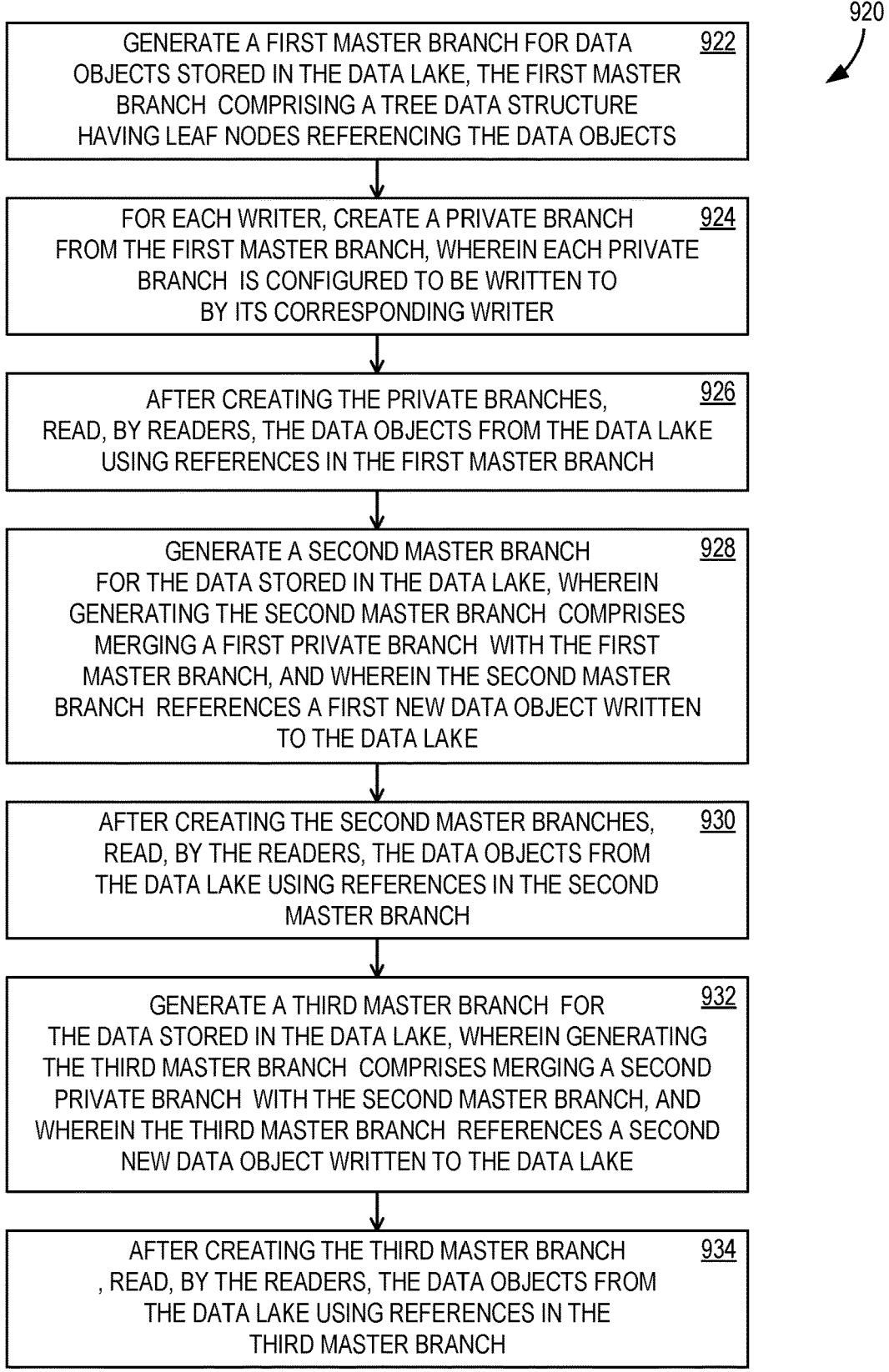

FIG. 9B illustrates a flowchart 920 of exemplary operations that are also associated with architecture 100. In some examples, the operations of flowchart 920 are performed by one or more computing apparatus 1018 of FIG. 10. Flowchart 920 commences with operation 922, which includes generating a first master branch for data objects stored in the data lake, the first master branch comprising a tree data structure having a plurality of leaf nodes referencing the data objects. Operation 924 includes, for each writer of a plurality of writers, creating a private branch from the first master branch, wherein each private branch is configured to be written to by its corresponding writer. Operation 926 includes, after creating the private branches, reading, by a plurality of readers, the data objects from the data lake using references in the first master branch.

Operation 928 includes generating a second master branch for the data stored in the data lake, wherein generating the second master branch comprises merging a first private branch of the created private branches with the first master branch, and wherein the second master branch references a first new data object written to the data lake. Operation 930 includes, after creating the second master branch, reading, by the plurality of readers, the data objects from the data lake using references in the second master branch.

Operation 932 includes generating a third master branch for the data stored in the data lake, wherein generating the third master branch comprises merging a second private branch of the created private branches with the second master branch, and wherein the third master branch references a second new data object written to the data lake. Operation 934 includes, after creating the third master branch, reading, by the plurality of readers, the data objects from the data lake using references in the third master branch.

Additional Examples

Some examples are described herein with respect to read operations occurring from the master branch. This includes notifying readers, after merging, of the new master branch. In other examples, read operations occur to any of the branches, including to any of the private branches. An example use case for reading from a private branch includes performing a particular transaction. In such examples, read operations for the particular transaction come from the private branch to maintain the semantics of the transaction. Another example use case includes processing a state of data (frozen at a point in time) by using a private branch. For example, an business insights analysis may be performed on data from a specific point in time in the past, in the private branch. Another example includes copying data from a table from a consistent point in time for an external application to access. This allows the reader to get a snapshot without witnessing any tearing when making a copy.

An example method comprises: creating a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and generating a new master branch for the data objects stored in the data lake, wherein generating the new master branch comprises merging the private branch with the first master branch, wherein the new master branch references a new data object written to the data lake, and wherein the new master branch is configured to be read from by the reader.

Another example method of providing a version control interface for accessing a data lake comprises: generating a first master branch for data objects stored in the data lake, the first master branch comprising a tree data structure having a plurality of leaf nodes referencing the data objects; for each writer of a plurality of writers, creating a private branch from the first master branch, wherein each private branch is configured to be written to by its corresponding writer; after creating the private branches, reading, by a plurality of readers, the data objects from the data lake using references in the first master branch; for each private branch of the created private branches, for which a merge is performed: generating a new master branch for the data stored in the data lake, wherein generating the new master branch comprises merging the private branch with the first master branch, and wherein the new master branch references a new data object written to the data lake; and after generating the new master branch, reading, by the plurality of readers, the data objects from the data lake using references in the new master branch.

An example computer system providing a version control interface for accessing a data lake comprises: a processor; and a non-transitory computer readable medium having stored thereon program code executable by the processor, the program code causing the processor to: create a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and generate a new master branch for the data objects stored in the data lake, wherein generating the new master branch comprises merging the private branch with the first master branch, wherein the new master branch references a new data object written to the data lake, and wherein the new master branch is configured to be read from by the reader.

Another example computer system providing a version control interface for accessing a data lake comprises: a processor; and a non-transitory computer readable medium having stored thereon program code executable by the processor, the program code causing the processor to: generate a first master branch for data objects stored in the data lake, the first master branch comprising a tree data structure having a plurality of leaf nodes referencing the data objects; for each writer of a plurality of writers, create a private branch from the first master branch, wherein each private branch is configured to be written to by its corresponding writer; after creating the private branches, read, by a plurality of readers, the data objects from the data lake using references in the first master branch; for each private branch of the created private branches, for which a merge is performed: generate a new master branch for the data stored in the data lake, wherein generating the new master branch comprises merging the private branch with the first master branch, and wherein the new master branch references a new data object written to the data lake; and after generating the new master branch, read, by the plurality of readers, the data objects from the data lake using references in the new master branch.

An example non-transitory computer storage medium has stored thereon program code executable by a processor, the program code embodying a method comprising: creating a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and generating a new master branch for the data objects stored in the data lake, wherein generating the new master branch comprises merging the private branch with the first master branch, wherein the new master branch references a new data object written to the data lake, and wherein the new master branch is configured to be read from by the reader.

An example non-transitory computer storage medium has stored thereon program code executable by a processor, the program code embodying a method comprising: generating a first master branch for data objects stored in the data lake, the first master branch comprising a tree data structure having a plurality of leaf nodes referencing the data objects; for each writer of a plurality of writers, creating a private branch from the first master branch, wherein each private branch is configured to be written to by its corresponding writer; after creating the private branches, reading, by a plurality of readers, the data objects from the data lake using references in the first master branch; generating a second master branch for the data stored in the data lake, wherein generating the second master branch comprises merging a first private branch of the created private branches with the first master branch, and wherein the second master branch references a first new data object written to the data lake; after creating the second master branch, reading, by the plurality of readers, the data objects from the data lake using references in the second master branch; generating a third master branch for the data stored in the data lake, wherein generating the third master branch comprises merging a second private branch of the created private branches with the second master branch, and wherein the third master branch references a second new data object written to the data lake; and after creating the third master branch, reading, by the plurality of readers, the data objects from the data lake using references in the third master branch.

Alternatively, or in addition to the other examples described herein, examples include any combination of the following:
- the tree data structure comprises a hash tree;
- the tree data structure comprises a Merkle tree;
- the referenced data objects are stored in a plurality of data lakes;
- a writer of the plurality of writers comprises an ingestion process;
- the ingestion process receives data from a data source and writes data objects into the data lake;
- the writer performs a transaction to the data lake;
- the transaction comprises a read operation and a write operation;
- the writer performs a plurality of transactions to the data lake;
- generating tables for the data objects, wherein each table comprises a set of name fields and maps a space of columns or rows to a set of the data objects;
- generating a parquet file during a merge;
- creating a private branch comprises: copying a root of the tree data structure of the first master branch and creating nodes of the private branch based on at least write operations by the writer;
- triggering a transactional merge process on a writer of a private branch committing a transaction, a timer expiration, or a resource usage threshold being met;
- writing data to a WAL;
- after generating the new master branch, reading, by the plurality of readers, the new data object from the data lake using the references in the new master branch;
- each private branch is configured to be protected against writing by a writer different than its corresponding writer;
- prior to generating the new master branch, reading, by a plurality of readers, the data objects from the data lake using references in the first master branch;
- after generating the new master branch, reading, by the plurality of readers, the data objects from the data lake using references in the new master branch;
- the first master branch is read-only;
- the new master branch is read-only;
- the second master branch is read-only;
- the third master branch is read-only;
- non-leaf nodes of the tree data structure comprise path components for the data objects;
- each reader of the plurality of readers is configured to read the first new data object using references in the second master branch or the third master branch, but not the first master branch;
- each reader of the plurality of readers is configured to read the second new data object using references in the third master branch, but not the first master branch or the second master branch;
- the data objects are readable by a query language;
- the ingestion process renders the written data objects readable by a query language; and
- the query language comprises SQL.

Exemplary Operating Environment

The present disclosure is operable with a computing device (computing apparatus) according to an embodiment shown as a functional block diagram 1000 in FIG. 10. In an embodiment, components of a computing apparatus 1018 may be implemented as part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hardcoded machine. Platform software comprising an operating system 1020 or any other suitable platform software may be provided on the computing apparatus 1018 to enable application software 1021 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 1018. Computer-readable media may include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. In some examples, computer storage media are implemented in hardware. Computer storage media include, but are not limited to, RAM, ROM, EPROM, EEPROM, persistent memory, non-volatile memory, phase change memory, flash memory or other memory technology, compact disc (CD, CD-ROM), digital versatile disks (DVD) or other optical storage, floppy drives, hard disks, magnetic cassettes, magnetic tape, magnetic disk storage, shingled disk storage or other magnetic storage devices, or any other non-transmission medium that can be used to store information for access by a computing apparatus. Computer storage media are tangible, non-transitory, and are mutually exclusive to communication media.

In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that the storage may be distributed or located remotely and accessed via a network or other communication link (e.g. using a communication interface 1023).

The computing apparatus 1018 may comprise an input/output controller 1024 configured to output information to one or more output devices 1025, for example a display or a speaker, which may be separate from or integral to the electronic device. The input/output controller 1024 may also be configured to receive and process an input from one or more input devices 1026, for example, a keyboard, a microphone, or a touchpad. In one embodiment, the output device 1025 may also act as the input device. An example of such a device may be a touch sensitive display. The input/output controller 1024 may also output data to devices other than the output device, e.g. a locally connected printing device. In some embodiments, a user may provide input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
creating a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and
writing a new data object into the private branch, wherein writing the new data object into the private branch comprises:
queuing data for the new data object in a write ahead log (WAL);
reading data from the WAL; and
adding the read data from the WAL to the private branch as the new data object; and
generating a new master branch for the data objects stored in the data lake, wherein generating the new master branch comprises merging the private branch with the first master branch, wherein the new master branch references the new data object written to the data lake, and wherein the new master branch is configured to be read from by the reader.

2. The method of claim 1, further comprising:
in event of a crash, replaying the WAL.

3. The method of claim 1, wherein the referenced data objects are stored in a plurality of data lakes.

4. The method of claim 1,
wherein the writer comprises an ingestion process, and wherein the ingestion process receives data from a data source and writes data objects into the data lake; or
wherein the writer performs a transaction to the data lake, wherein the transaction comprises a read operation and a write operation.

5. The method of claim 1, wherein creating the private branch comprises:
copying a root of the tree data structure of the first master branch; and
creating nodes of the private branch based on at least write operations by the writer.

6. The method of claim 1, further comprising triggering a transactional merge process on:
the writer committing a transaction,
a timer expiration, or
a resource usage threshold being met.

7. The method of claim 1, further comprising:
prior to generating the new master branch, reading, by a plurality of readers, the data objects from the data lake using references in the first master branch; and
after generating the new master branch, reading, by the plurality of readers, the data objects from the data lake using references in the new master branch.

8. The method of claim 1, further comprising:
creating a second private branch from the first master branch; and
merging the second private branch with the new master branch.

9. A computer system comprising:
a processor; and
a non-transitory computer readable medium having stored thereon program code executable by the processor, the program code causing the processor to:
create a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and
write a new data object into the private branch, wherein writing the new data object into the private branch comprises:
queuing data for the new data object in a write ahead log (WAL);
reading data from the WAL; and
adding the read data from the WAL to the private branch as the new data object; and
generate a new master branch for the data objects stored in the data lake, wherein generating the new master branch comprises merging the private branch with the first master branch, wherein the new master branch references the new data object written to the data lake, and wherein the new master branch is configured to be read from by the reader.

10. The computer system of claim 9, wherein merging the private branch with the first master branch comprises applying one or more conflict resolution policies.

11. The computer system of claim 9,
wherein the writer comprises an ingestion process, and wherein the ingestion process receives data from a data source and writes data objects into the data lake; or
wherein the writer performs a transaction to the data lake, wherein the transaction comprises a read operation and a write operation.

12. The computer system of claim 9, wherein creating the private branch comprises:
copying a root of the tree data structure of the first master branch; and
creating nodes of the private branch based on at least write operations by the writer.

13. The computer system of claim 9, wherein the program code is further operative to trigger a transactional merge process on:
the writer committing a transaction,
a timer expiration, or
a resource usage threshold being met.

14. The computer system of claim 9, wherein the program code is further operative to:
prior to generating the new master branch, reading, by a plurality of readers, the data objects from the data lake using references in the first master branch; and
after generating the new master branch, reading, by the plurality of readers, the data objects from the data lake using references in the new master branch.

15. A non-transitory computer storage medium having stored thereon program code executable by a processor, the program code embodying a method comprising:
creating a private branch from a first master branch, the first master branch comprising a tree data structure having a plurality of leaf nodes referencing data objects stored in a data lake, wherein the private branch is configured to be written to by a writer and wherein the first master branch is configured to be read from by a reader; and
writing a new data object into the private branch, wherein writing the new data object into the private branch comprises:
queuing data for the new data object in a write ahead log (WAL);
reading data from the WAL; and
adding the read data from the WAL to the private branch as the new data object; and generating a new master branch for the data objects stored in the data lake, wherein generating the new master branch comprises merging the private branch with the first master branch, wherein the new master branch references the new data object written to the data lake, and wherein the new master branch is configured to be read from by the reader.

16. The computer storage medium of claim 15, wherein the tree data structure is stored in the data lake or in a separate storage system.

17. The computer storage medium of claim 15, wherein the program code further comprises:
    prior to generating the new master branch, reading, by a plurality of readers, the data objects from the data lake using references in the first master branch; and
    after generating the new master branch, reading, by the plurality of readers, the data objects from the data lake using references in the new master branch.

18. The computer storage medium of claim 15, wherein the new master branch and the private branch are configured to be read from by the reader.

19. The computer storage medium of claim 15, wherein the program code further comprises triggering a transactional merge process on:
    the writer committing a transaction,
    a timer expiration, or
    a resource usage threshold being met.

20. The computer storage medium of claim 15, wherein the program code further comprises:
    in event of a crash, replaying the WAL.

* * * * *